United States Patent [19]
Boswell

[11] Patent Number: 5,413,282
[45] Date of Patent: May 9, 1995

[54] PRESSURE COMPENSATING EMITTER WITH SHUT DOWN FLUSH

[75] Inventor: Michael J. Boswell, Lakeside, Calif.

[73] Assignee: James Hardie Irrigation, Inc., Laguna Niguel, Calif.

[21] Appl. No.: 144,748

[22] Filed: Oct. 28, 1993

[51] Int. Cl.$^6$ .............................................. B05B 15/00
[52] U.S. Cl. ...................................... 239/542; 239/571
[58] Field of Search ............. 239/542, 547, 571, 533.1, 239/272

[56] References Cited

U.S. PATENT DOCUMENTS

| | | | |
|---|---|---|---|
| 3,954,223 | 5/1976 | Wichman et al. | 239/542 X |
| 4,209,133 | 6/1980 | Mehoudar | 239/542 |
| 4,215,822 | 8/1980 | Mehoudar | 239/542 |
| 4,226,368 | 10/1980 | Hunter | 239/542 |
| 4,344,576 | 8/1982 | Smith | 239/542 |
| 4,392,616 | 7/1983 | Olson | 239/542 X |
| 4,424,936 | 1/1984 | Marc | 239/542 X |
| 4,502,631 | 3/1985 | Christen | 239/542 X |
| 4,533,083 | 8/1985 | Tucker | 239/542 |
| 4,573,640 | 3/1986 | Mehoudar | 239/542 |
| 4,627,573 | 12/1986 | Havens et al. | 239/542 |
| 4,682,730 | 7/1987 | Smeyers | 239/542 X |
| 4,718,608 | 1/1988 | Mehoudar | 239/542 |
| 4,796,660 | 1/1989 | Bron | 239/542 X |
| 4,846,406 | 7/1989 | Christy | 239/542 |
| 4,869,432 | 9/1989 | Christy | 239/542 |
| 4,909,441 | 3/1990 | Christy | 239/542 X |
| 5,279,462 | 1/1994 | Mehouder | 239/542 |

FOREIGN PATENT DOCUMENTS

| | | | |
|---|---|---|---|
| 78/37128 | 12/1979 | Australia | 239/542 |
| 2397788 | 3/1979 | France | 239/272 |
| 2525496 | 10/1983 | France | 239/542 |
| 2604053 | 3/1988 | France | 239/533.1 |

OTHER PUBLICATIONS

Hardie Irrigation, "Turbo SC+ Emitter", 1992.

Primary Examiner—Andres Kashnikow
Assistant Examiner—Lesley D. Morris
Attorney, Agent, or Firm—Gordon L. Peterson

[57] ABSTRACT

An emitter for use in irrigation comprising a housing and a flow restrictor in the housing. The housing has an inlet which can be connected to a source of irrigation liquid and an outlet. The flow restrictor reduces the pressure of the irrigation liquid to provide drip or trickle flow at the outlet. A spike flow inhibitor is provided in the housing for substantially preventing flush flow through the housing upon initiation of the flow of irrigation liquid through the housing. The flow restrictor is responsive to at least a predetermined reduction in pressure of the irrigation liquid at the inlet for causing flush flow through the flow restrictor.

9 Claims, 3 Drawing Sheets

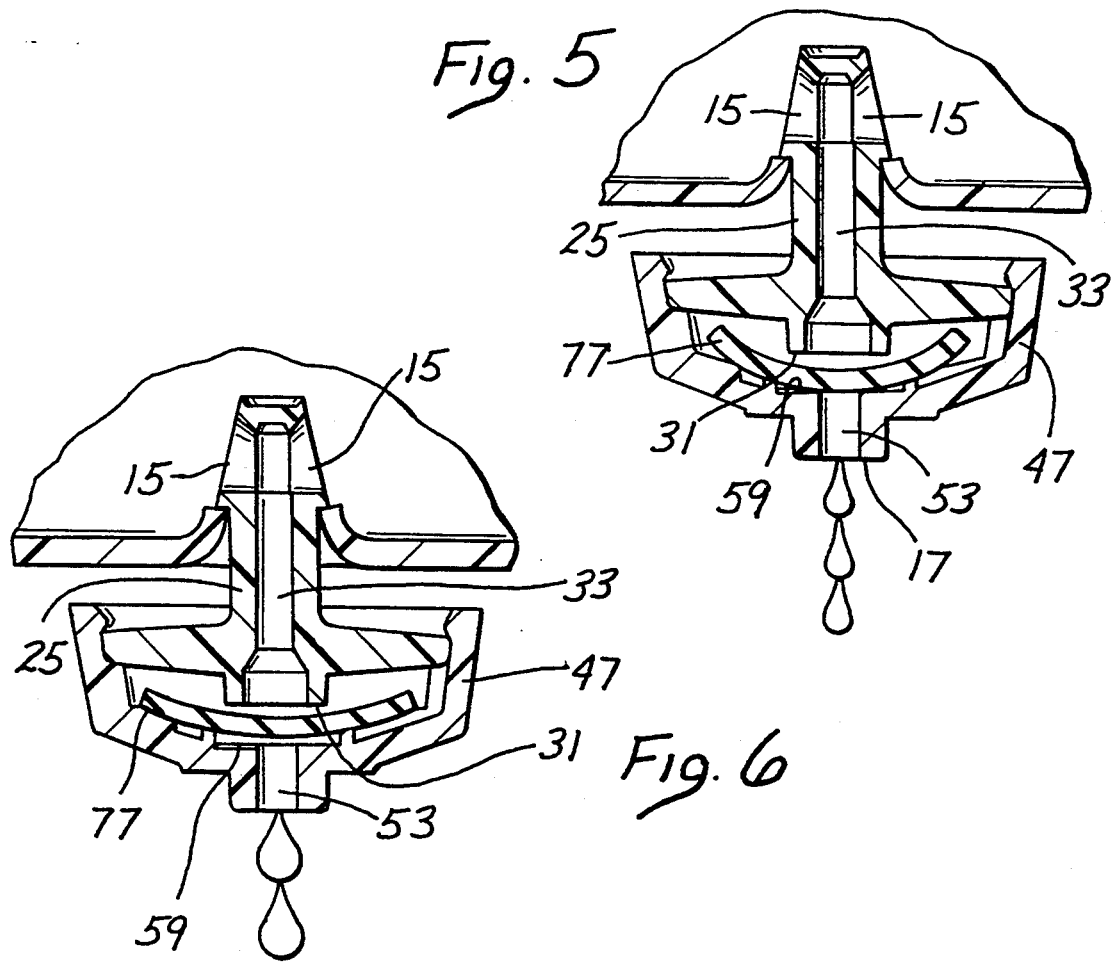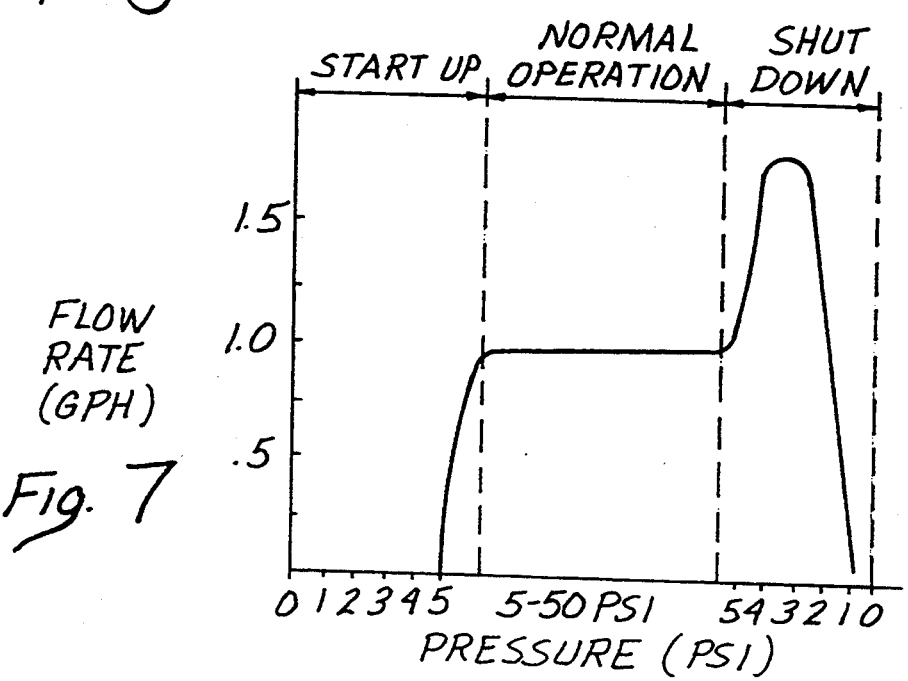

PRESSURE COMPENSATING EMITTER WITH SHUT DOWN FLUSH

BACKGROUND OF THE INVENTION

A drip irrigation emitter receives water at relatively high line pressure and provides a drip or trickle output for irrigation purposes. Emitters are commonly inserted through the wall of a hose which supplies the water at line pressure. Some emitters are pressure compensating in that they provide a relatively constant output regardless of fluctuations in line pressure at the inlet.

To achieve drip or trickle flow, an emitter typically conducts the water from the inlet through an energy dissipating flow path such as a tortuous flow path of relatively small cross-sectional area and/or through one or more orifices of small cross-sectional area. The small cross-sectional areas are useful in reducing the pressure of the water so that a drip or trickle output is obtained.

One problem with emitters is that the small cross-sectional area through which the irrigation fluid must flow tends to trap debris and particulates, and this can clog the emitter and make it ineffective for irrigation. To address this problem, it is known to provide a relatively large or flush flow through the emitter when the water is first turned on. Some emitters provide flush flow both at the start and end of the irrigation cycle. To accomplish flush flow, the emitter is constructed so that the flow path through it is of larger cross-sectional area at the beginning of the irrigation cycle and this allows the flush flow to wash debris and particulates through the emitter and the outlet of the emitter.

One problem with providing flush flow at the start up of the irrigation cycle is that the irrigation system must be sized to supply a relatively large initial "spike" flow rate and this increases the cost for system components such as pumps, filters, piping and valves. If the system is not designed for this large spike flow, the differential pressure necessary to cause the emitter to create the relatively small cross-sectional areas needed for drip flow may not occur.

Emitters commonly employ an elastomeric disc and a flow channel in the housing against which the disc is moved by differential pressure across the disc to create the small cross-sectional areas required for a drip flow. The differential pressure is created by the flow of water through a flow passage through or around the disc. Initial spike flow can be reduced or eliminated by using a flow passage of small cross sectional area but this increases the likelihood that the flow passage will become plugged with debris or particulates. On the other hand, a flow passage of larger cross section area may not generate the needed differential pressure across the elastomeric disc to create the small cross-sectional areas needed for drip irrigation.

SUMMARY OF THE INVENTION

This invention solves these problems by providing an emitter for use in irrigation which does not require oversizing of the system components to accommodate flush flow. With this emitter, the relatively large spike flow on system startup is substantially eliminated and flushing is accomplished at the end of the cycle when the system is shutting down. This does not require oversizing of the system.

An emitter constructed in accordance with this invention includes a housing having an inlet couplable to a source of irrigation liquid and an outlet. The irrigation liquid is primarily water but may also include additives such as fertilizer.

The emitter also includes a flow restrictor in the housing for reducing the pressure of irrigation liquid to provide drip or trickle flow of the irrigation liquid at the outlet of the housing. A spike flow inhibitor is provided in the housing for substantially preventing flush flow through the housing upon initiation of the flow of irrigation liquid to the housing. The flow restrictor is responsive to at least a predetermined reduction in pressure of the irrigation liquid at the inlet, such as at system shutdown, for causing flush flow through the flow restrictor. With this arrangement, flush flow occurs at the end of the irrigation cycle and not at the beginning.

The spike flow inhibitor may include a valve such as a pressure responsive valve for receiving irrigation liquid from the inlet. The valve is in an open position in response to the irrigation liquid at the inlet being of at least about a first pressure and is in a closed position in response to the irrigation liquid at the inlet being at or below about a second pressure which is less than the first pressure. In the open position, the valve allows the liquid to pass through the valve and in the closed position the valve substantially prevents liquid from passing through the valve. With this construction, the pressure responsive valve is a differential pressure valve in that it opens at a first relatively high pressure and closes at a second relatively low pressure.

In order that the flow restrictor can reduce the pressure and flow rate of the liquid passing through it, it has a flow restricting position in which the flow restrictor restricts flow to the outlet. This occurs in response to the flow restrictor receiving irrigation liquid at about the first or relatively high pressure from the valve.

The flow restrictor also has a flush position in which the flow restrictor allows flush flow to the outlet. This occurs in response to the flow restrictor receiving irrigation liquid from the valve at a third pressure which is between the first and second pressures.

With this arrangement, when the valve opens in response to the liquid being at the first pressure, it immediately supplies liquid at this first relatively high pressure to the flow restrictor which responds by going immediately to the flow restricting position. This substantially prevents startup flush or relatively high spike flow at the beginning of the cycle. On the other hand, when the system is shut down and the pressure at the inlet of the emitter drops to the third or intermediate pressure level, the flow restrictor moves to the flush position. Water is supplied through the emitter for flush flow because the pressure has not yet dropped to the second pressure level at which the valve would close. Consequently, while the pressure is dropping from the third pressure to the second pressure flush flow through the flow restrictor and the emitter can take place.

In a preferred construction, the valve includes a valve seat and a valve element biased against the valve seat. To make the valve a differential area valve, the valve seat preferably circumscribes an area of the valve element which is less than the area of the valve element which faces the valve seat. The valve element preferably includes a resilient disc, and in this event, the resilience of the disc can be used to bias the disc against the valve seat. The resilience of the disc acting against the valve seat coupled with the relatively small area of the disc the inlet pressure can act against, requires a relatively high inlet pressure to open the valve. On the other hand, once the disc is moved away from the valve seat, the inlet pressure can act over the full area of the disc and this rapidly and forcefully moves the valve to the open position. Also, because the area of the disc exposed to the inlet pressure in the open position is larger than in the closed position of the valve, the valve remains open until the inlet pressure drops to a pressure which is significantly lower than the pressure required to open the valve.

In a preferred construction, the flow restrictor includes an open sided flow channel and a pressure responsive restrictor member responsive to receiving irrigation fluid at about the first relatively high pressure from the valve to close the open side of the channel to at least partially provide the flow restriction position. The pressure responsive restrictor member is also responsive to receiving irrigation liquid from the valve at about the third or intermediate pressure level for opening the side of the flow channel to at least partially provide the flush position.

Although this invention is applicable to emitters whether or not they are pressure compensating, it is particularly adapted to pressure compensating emitters. By making the restrictor member appropriately deformable, it can be forced further into the open sided flow channel greater distances with increasing inlet pressure so as to make the flow restrictor and the emitter pressure compensating.

Although separate discs can be used for the valve and the flow restrictor, preferably they share a common disc which is both resilient and deformable. To enable irrigation liquid to flow from the inlet to the outlet side of the disc, an appropriate flow passage is provided. In a preferred construction, this flow passage includes a groove adjacent to the periphery of the resilient disc. Because the disc does not begin its movement toward the flow restricting position until after inlet pressure has built up to a relatively high first pressure level, this groove can be relatively large and still provide an adequate pressure drop to obtain rapid movement of the disc to the flow restricting position. Because the groove has a relatively large cross-sectional area, it is less likely to entrap debris and become clogged.

The invention together with additional features and advantages thereof may best be understood by reference to the following description taken in connection with the accompanying illustrative drawings.

BRIEF DESCRIPTION OF THE DRAWINGS

FIGS. 5 and 6 are sectional views similar to FIG. 2 illustrating the emitter in the flow restricting or operational position and in the flush position, respectively.

FIG. 7 is a plot showing flow rate through the emitter versus pressure.

DESCRIPTION OF THE PREFERRED EMBODIMENT

Figure 1:
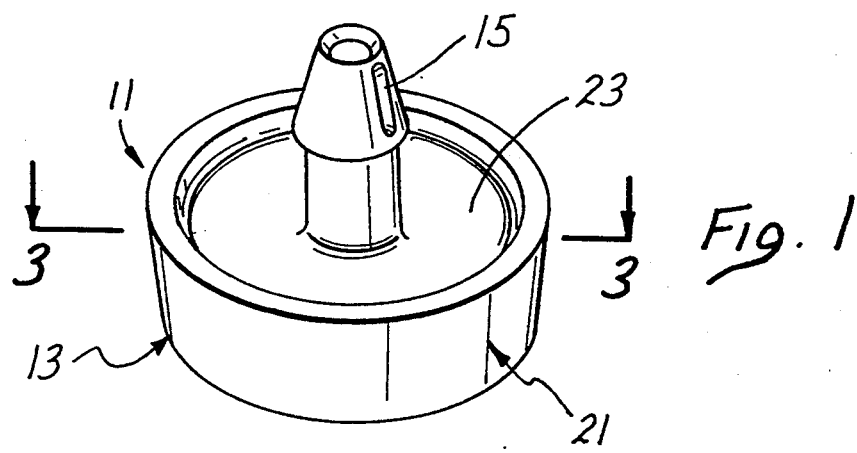
FIG. 1 is a perspective view of an emitter constructed in accordance with the teachings of this invention.

FIG. 1 shows a drip irrigation emitter 11 which includes a housing 13 having an inlet 15, an outlet 17 (FIG. 2) and an interior chamber 18. Although various constructions are possible, in this embodiment the housing 13 includes housing sections 19 and 21, each of which is molded from a suitable polymeric material such as polypropylene. Thus, each of the housing sections 19 and 21 is of integral, one-piece construction.

The housing section 19 includes an end wall 23, a stem 25 projecting from a central region of the end wall and a barb 27. The housing section 19 also has a standpipe or boss 29 coaxial with the stem 25 and projecting into the chamber 18 of the housing 13. The boss 29 terminates in an annular valve seat 31. An inlet passage 33 extends from the inlet 15 through the stem 25 and the boss 29 and terminates at the valve seat 31.

Although various constructions are possible, the barb 27 terminates in an end wall 35 and the inlet 15 is in the form of a plurality of apertures in the side or periphery of the barb 27 and the apertures face radially outwardly of the inlet passage 33. The barb 27 can be forced through an opening 37 in the wall of an irrigation conduit 39 which carries an irrigation liquid. If desired, the barb 27 may terminate in a sharp annular ridge 41 which can be used to punch the barb through the wall of the conduit 39 to form the opening 37 in which event the conduit 39 forms a collar 42 around a portion of the stem 25. A shoulder 43 on the barb keeps the barb 27 from being withdrawn back through the opening 37.

The stem 25 is of sufficient length to allow insertion of the barb 27. Preferably, the end wall 23, the stem 25, the barb 27, the boss 29 and the inlet passage 33 are all coaxial. Radially extending ribs 45 are provided on the inner face of the end wall 23 to strengthen the end wall.

The housing section 21 includes a peripheral wall 47, an end wall 49, a projection 51 and an outlet passage 53 coaxial with the inlet passage 33 leading from the chamber 18 of the housing 13 to the outlet 17. The end wall 49 has an open sided flow channel 55 (FIGS. 2 and 3) which leads to the outlet 17 via the outlet passage 53. The flow channel 55 includes a tortuous section 57 and a groove 59 in the end wall 49. The tortuous section 57 is defined by a series of circumferentially spaced outer ribs 61 which project radially inwardly and a series of circumferentially spaced inner ribs 63 which project radially outwardly from an annular wall 65 which is coaxial with the outlet passage 53. Although various different patterns may be employed, in this embodiment each of the ribs 63 is equally spaced circumferentially from an adjacent pair of the ribs 61 and each of the ribs 61 and 63 terminates at substantially the same radial distance from the axis or center of the housing 13.

Figure 3:
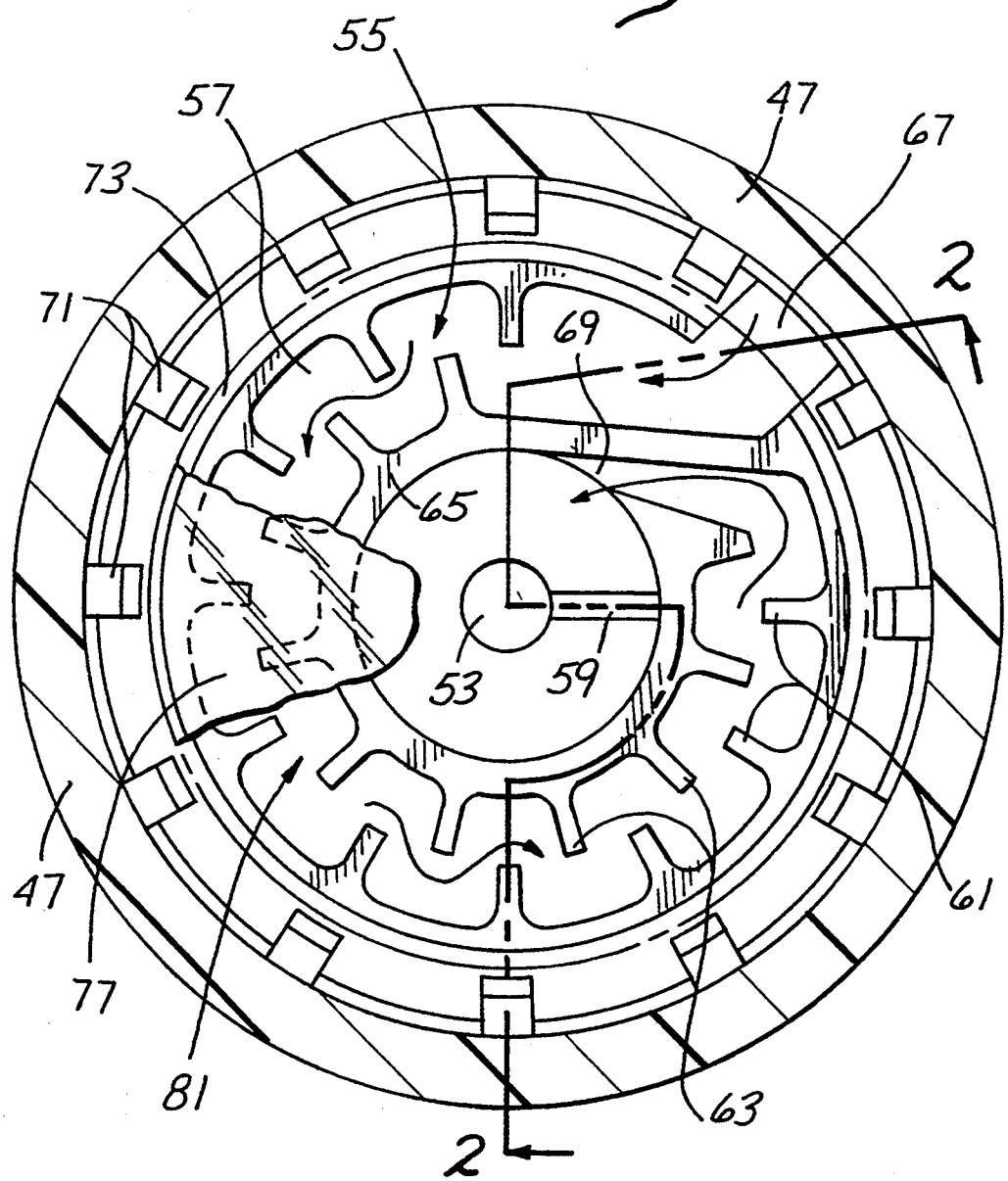
FIG. 3 is an enlarged sectional view taken generally along line 3—3 of FIG. 1 with a portion of the disc removed.

A groove 67 leads to the flow channel 55 and an opening 69 in the annular wall 65 provides communication between the tortuous section 57 and the interior of the annular wall 65. Although the opening 69 may be of various cross sectional configurations, as shown in FIG. 3 it is generally rectangular.

The housing section 21 also has positioning ribs 71 projecting radially inwardly from the peripheral wall 47 in circumferentially spaced relationship. The end wall 49 provides an annular shelf 73 at the inner ends of the positioning rib 71.

The housing section 21 is generally dish or cup shaped and the end wall 23 is snap fit into the outer regions of the peripheral wall 47 beneath an annular bead 75 (FIG. 2) formed on the peripheral wall. The end wall 23 rests on the outer or top end (as viewed in FIG. 2) of the positioning ribs 71. The end wall 23 forms a liquid tight interference fit with the peripheral wall 47. If desired, the end wall 23 may be bonded to the peripheral wall 47 using, for example, an adhesive and/or an ultrasonic weld.

The emitter 11 also includes a resilient, deformable disc 77. The disc 77 is preferably constructed of an elastomeric material such as silicone rubber or of ethylene propylene (EPDM) rubber. In this embodiment, the disc 77 is round and has a thickness of from about 0.025 inch to about 0.080 inch with 0.040 inch being preferred and hardness of from about 50 to about 65 Shore A with 58 Shore A being preferred.

Figure 2:
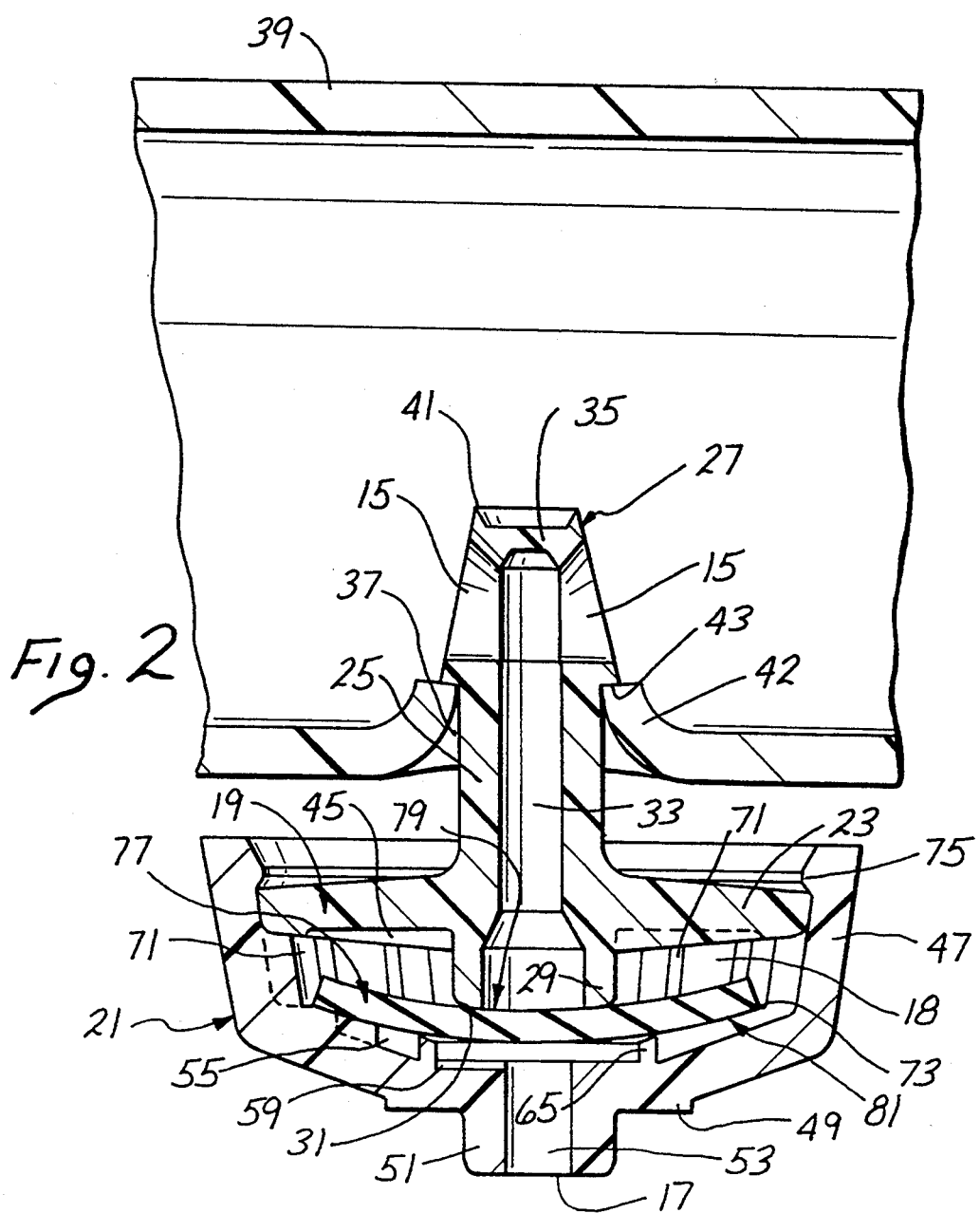
FIG. 2 is an axial sectional view taken generally along line 2—2 of FIG. 3 and rotated 90° counterclockwise and also showing a fragment of an irrigation conduit with the valve in the closed position.

A peripheral region of the disc 77 rests on the shelf 73 as shown in FIGS. 2 and 3. In an unstressed condition, the disc 77 is planar. However, when installed in the chamber 18 of the housing 13, the valve seat 31 contacts an annular region of the disc 77 and circumscribes a central region of the disc to force the disc out of its planar configuration. Consequently, the disc 77 is biased by its own resilience against the valve seat 31. The area of the disc 77 circumscribed by the valve seat 31 is less than the area of the disc facing the valve seat. Thus, the disc 77 and the valve seat 31 constitute a valve 79 and the disc serves as a valve element.

Figure 4:
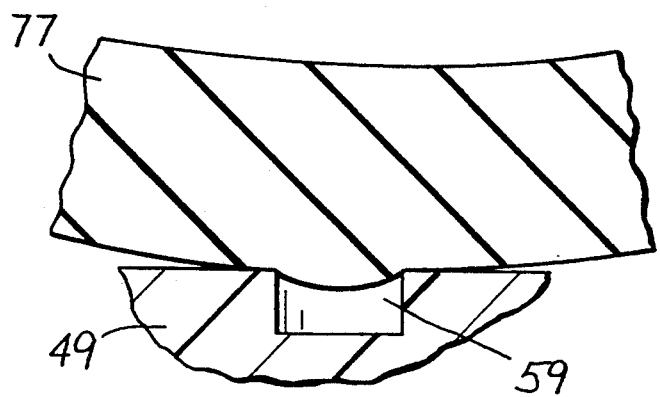
FIG. 4 is an enlarged fragmentary sectional view illustrating the disc being forced into a groove for pressure compensation purposes.

The disc 77 in the closed position of FIG. 2 does not completely close the open side of the flow channel 55. For example, the disc 77 is spaced axially from the groove 59 and may only loosely close the open side of the tortuous section 57 of the flow channel 55. As such, the disc 77 also forms a part of a flow restrictor 81 which also includes the open sided flow channel 55. As explained more fully below, the disc 77 can be forced by fluid under pressure to completely close the open side of the flow channel 55 to provide a flow restricting position (FIG. 5) in which flow to the outlet 17 is restricted. Moreover, the resilient disc 77 can be forced into the groove 59 varying amounts depending upon the fluid pressure at the inlet 15 (FIG. 4) to provide the emitter 11 with a pressure compensating feature. Thus, the resilient disc 77 cooperates with a cooperating surface on the housing section 21 in the flow restricting position to restrict flow to the outlet 17. Thus, the disc 77 serves both as a valve element for the valve 79 and as a restrictor member for the flow restrictor 81.

In use of the emitter 11, the disc 77 is in the position shown in FIG. 2 prior to supplying the conduit 39 with irrigation liquid under pressure. In this position, the disc 77 serves as a valve element biased against the valve seat 31 to maintain the valve 79 in a closed position. When the irrigation liquid under pressure is supplied to the conduit 39, the pressure rises from approximately zero to line pressure which may be, for example, between 5 psi to about 50 psi. The irrigation liquid under pressure acts only on the central region of the disc 77 which is surrounded by the valve seat 31. The resilience of the disc 77 is sufficient to maintain the valve closed until the pressure of the irrigation liquid at the inlet 15 rises to a first or opening pressure which may be, for example, about 5 psi. The force exerted against the disc is equal to the pressure acting on the central region of the disc 77 times the area of such central region.

When the liquid force tending to open the valve 79 exceeds the force exerted by the disc 77 against the seat 31, the disc is forced axially away from the valve seat 31 to open the valve. Immediately, the chamber 18 of the emitter 11 is filled with water at this relatively high opening pressure of about 5 psi, but now this pressure acts upon the entire surface area of the disc 77 which faces upwardly as viewed in FIG. 2. Because of the increase in area of the disc 77 exposed to this pressure, the force on the disc suddenly increases greatly and this rapidly moves the disc to the flow restricting position (FIG. 5) in which the disc is forced against the open sided flow channel 55 including the groove 59 so that flow through the flow channel 55 is restricted. This serves as a spike flow inhibitor which substantially prevents liquid flow through the housing 13 upon initiation of the flow of irrigation liquid through the housing. In the flow restricting position, drip or trickle flow is provided at the outlet 17.

In order for the irrigation liquid to enter the flow channel 55, it must flow through the groove 67 (FIG. 3) which is closely adjacent the periphery of the disc 77. The groove 67 must have a sufficiently small cross sectional area so as to provide a pressure drop sufficient to move the disc 77 to the flow restricting position in which it is tightly seated against the flow channel 55. On the other hand, because the valve 79 opens at a relatively high pressure, the cross sectional area of the groove 67 may be enlarged and still provide adequate pressure drop to move the disc 77 to the flow restricting position. The enlarged cross section dimensions of the groove 67 reduce the likelihood that this groove will become clogged by debris or particulates.

On system shut down, the supply of irrigation liquid under pressure to the conduit 39 is terminated. This results in the pressure within the conduit 39 and hence at the inlet 15 dropping over time to a second or valve closing pressure which is less than the first or opening pressure and which may be, for example, about 1 to 2 psi. The valve 79 closes in response to the pressure at the inlet 15 dropping to the closing pressure as described more fully below. However, before the closing pressure is reached the pressure at the inlet 15 decreases to some intermediate value between the opening pressure and the closing pressure such as slightly less than 5 psi, the liquid force acting on the upper (as viewed in FIG. 2) face of the disc 77 is insufficient to hold the disc in the flow restricting position of FIG. 5. Consequently, the disc 77 moves upwardly (as viewed in FIG. 6) to separate from the flow channel 55 and place the flow restrictor 81 in a flush position in which the flow restrictor becomes ineffective as a flow restrictor and flush flow through the essentially unrestricted flow channel 55 occurs as shown in FIG. 6. As the pressure drops to the closing pressure, the resilience of the disc 77 becomes sufficient to overcome the force of the inlet pressure acting over the full upper face of the disc 77 to return the disc 77 to the closed position of FIG. 2 and terminate flow through the emitter 11. Thus, flushing of the emitter 11 occurs in response to a predetermined reduction in pressure of the irrigation liquid at the inlet 15 that occurs when the system is shut down.

FIG. 7 shows the relationship between flow rate in gallons per hour and pressure at the inlet 15 in psi for startup, normal operation and shut down. Thus, during startup there is no flow through the emitter 11 until the pressure at the inlet 15 rises to approximately 5 psi whereupon the flow through the emitter gradually increases to a flow rate such as one gallon per hour which is maintained through normal operation even though pressure at the inlet 15 may range from about 5 psi to about 50 psi. The flow rate remains substantially constant because of the pressure compensation feature of the invention which forces the disc 77 deeper into the groove 59 (FIG. 4) as the pressure at the inlet 15 increases.

During shut down, the pressure at the inlet 15 drops below 5 psi and flushing flow occurs until the pressure at the inlet 15 drops to between 1 and 2 psi. The flushing flow which occurs during shut down is not of the high spike flow type which commonly occurs in emitters during startup. The pressure and flow rates shown in FIG. 7 and elsewhere herein are merely exemplary.

Although an exemplary embodiment of the invention has been shown and described, many changes, modifications and substitutions may be made by one having ordinary skill in the art without necessarily departing from the spirit and scope of this invention.

I claim:

1. An emitter for use in irrigation comprising:
   a housing having an inlet couplable to a source of irrigation liquid and an outlet;
   a valve including a valve seat in said housing and a resilient disc, said inlet leading to said valve seat;
   said resilient disc having an inlet side facing the valve seat, a first region of said disc lying radially outwardly of the valve seat, said disc being supported in said housing so as to seat a second region of the disc on the valve seat and to resiliently bias the second region of the disc against the valve seat, said disc being movable away from the valve seat to an open position in response to the irrigation liquid at the inlet being of at least about a first pressure and being biased against the valve seat to a closed position in response to the irrigation liquid at the inlet being at or below about a second pressure which is less than said first pressure;
   an open sided flow channel between the disc and the outlet with the open side of the flow channel facing the disc, said disc being movable away from the valve seat in response to receiving irrigation liquid at about said first pressure from the valve to close the open side of the flow channel to provide a restricted flow channel leading to said outlet and to substantially prevent flush flow of irrigation liquid through the housing upon initiation of the flow of irrigation liquid through the valve, said disc being in a flush position in which the disc allows flush flow to the outlet in response to receiving irrigation liquid from said valve at a third pressure which is between said first and second pressures; and
   a flow passage in said housing leading from said inlet side of the disc to the open sided flow channel.

2. An emitter as defined in claim 1 wherein the first and second regions of the disc are peripheral and central regions respectively.

3. An emitter as defined in claim 1 wherein the disc is deformable to make the restricted flow channel pressure compensating.

4. An emitter as defined in claim 1 including a boss projecting into the interior of the housing and terminating in said valve seat.

5. An emitter for use in irrigation comprising:
   a housing having an inlet couplable to a source of irrigation liquid and an outlet;
   a flow restrictor including a resilient disc in said housing for reducing the pressure of the irrigation liquid to provide drip or trickle flow of the irrigation liquid at the outlet;
   a spike flow inhibitor in said housing for substantially preventing flush flow of irrigation liquid through the housing upon initiation of the flow of irrigation liquid through the housing, said spike flow inhibitor including said resilient disc and;
   said flow restrictor being responsive to at least a predetermined reduction in pressure of the irrigation liquid at the inlet for allowing flush flow through the flow restrictor.

6. An emitter as defined in claim 5 wherein said spike flow inhibitor includes a valve.

7. An emitter as defined in claim 6 wherein the valve includes a valve seat and a resilient disc biased against the valve seat, and the flow restrictor also includes said disc.

8. An emitter as defined in claim 1 wherein the disc is closely adjacent the flow channel when the second region of the disc is seated on the valve seat.

9. An emitter as defined in claim 1 wherein the housing includes a first housing section having said inlet, a boss terminating in said valve seat and an inlet passage extending from the inlet to the valve seat and a second housing section having said outlet, said open sided flow channel and an outlet passage leading from the open sided flow channel to the outlet.

* * * * *